United States Patent
Gleim et al.

(10) Patent No.: US 7,747,545 B2
(45) Date of Patent: Jun. 29, 2010

(54) DELIVERY RULE FOR CUSTOMER LEADS RESPONSE SYSTEM AND METHOD

(75) Inventors: James Gleim, Sherwood, WI (US);
Timothy Witmer, West Allis, WI (US);
Scott Petersen, Jackson, WI (US);
Aaron Schafer, Waukesha, WI (US);
Christopher Pietschmann, West Bend, WI (US); Nikola Basta, Greendale, WI (US)

(73) Assignee: Move Sales, Inc., Westlake Village, CA (US)

( * ) Notice: Subject to any disclaimer, the term of this patent is extended or adjusted under 35 U.S.C. 154(b) by 688 days.

(21) Appl. No.: 11/558,414

(22) Filed: Nov. 9, 2006

(65) Prior Publication Data

US 2008/0114712 A1 May 15, 2008

(51) Int. Cl.
*G06F 15/18* (2006.01)
*G06Q 30/00* (2006.01)
(52) U.S. Cl. .................................. 706/8; 705/26; 706/47
(58) Field of Classification Search .................. 705/1, 705/8, 10, 26; 715/962; 709/217; 706/47
See application file for complete search history.

(56) References Cited

U.S. PATENT DOCUMENTS

| | | | |
|---|---|---|---|
| 5,883,940 A | 3/1999 | Thornton | |
| 6,067,525 A | 5/2000 | Johnson et al. | |
| 6,208,975 B1 | 3/2001 | Bull et al. | |
| 6,236,977 B1 * | 5/2001 | Verba et al. | 705/10 |
| 6,529,948 B1 * | 3/2003 | Bowman-Amuah | 709/217 |
| 7,212,990 B1 * | 5/2007 | Greden et | 705/26 |
| 2002/0087387 A1 * | 7/2002 | Calver et al. | 705/10 |
| 2003/0033242 A1 * | 2/2003 | Lynch et al. | 705/38 |
| 2003/0101063 A1 * | 5/2003 | Sexton et al. | 705/1 |
| 2003/0229504 A1 | 12/2003 | Hollister | |
| 2004/0103041 A1 * | 5/2004 | Alston | 705/26 |
| 2006/0190396 A1 * | 8/2006 | Winterhalder | 705/39 |
| 2007/0219851 A1 * | 9/2007 | Taddei et al. | 705/10 |

OTHER PUBLICATIONS

Information on HoneGain, 1999-2001.
"Fidelity National Information Solutions To Provide Suite Of Technology Tools For Prudential Real Estate", May 13, 2003, printed from www.rebuz.com.

* cited by examiner

*Primary Examiner*—David R Vincent
*Assistant Examiner*—Ola Olude-Afolabi
(74) *Attorney, Agent, or Firm*—Alston & Bird LLP

(57) ABSTRACT

A lead response system is provided comprising a customizable lead delivery rules engine and a customizable escalation rules engine for delivering leads to appropriate responders and re-routing undeveloped leads to different responders. Each delivery rule includes two or more criteria which may be met in order for the lead to be delivered to the responder specified in the particular rule. A lead that is not accepted by the responder to whom it was delivered within a user-defined time frame is re-routed for delivery to a new responder according to a set of escalation rules. The escalation rules may include delivery instructions specifying the new responder or may re-route the lead to the delivery rules engine for delivery to a new responder according to a re-application of the delivery rules.

26 Claims, 13 Drawing Sheets

DELIVERY RULE FOR CUSTOMER LEADS RESPONSE SYSTEM AND METHOD

FIELD OF THE INVENTION

The present invention relates to customer leads management technology. Specifically, this invention relates to routing of customer leads to responders (such as brokers or agents).

BACKGROUND OF THE INVENTION

Many businesses today, large and small, collect information from potential customers in an effort to provide goods and services to meet customer needs. In the age of the Internet and Interactive Voice Response (IVR) systems, large amounts of information can be collected automatically, without the physical involvement of a sales representative or any affirmative act by the consumer, at any time of day and any day of the week. Information captured from a potential consumer or client is commonly referred to as a lead.

Leads may be generated in a number of ways. For example, a consumer may fill out a form on a webpage requesting information on an offering, such as a certain product or service. Similarly, a consumer may call a hotline associated with an offering, and information on the consumer's needs may be collected by a sales representative or through IVR. Leads may even be generated without any affirmative request by the consumer. For example, a consumer may go to a particular webpage on the Internet and spend time researching a certain product. The webpage may access information about the consumer from the consumer's computer, such as the consumer's profile and settings, and a lead may be generated based on the information collected.

Once a lead is generated, it must be routed to a responder for development within an acceptable time frame. For example, a lead concerning a home purchase inquiry may be automatically routed to a real estate agent working for a particular broker. Routing may be accomplished automatically based on the time elapsed since the agent last received a lead. In other words, leads may be routed such that the agent who has not received a lead for the longest amount of time is the first in line to receive the next lead generated in an effort to fairly distribute leads and potential commission revenues.

However, such a fixed rule to govern the routing of leads does not consider the fact that certain real estate agents, for example, may be specialized in dealing with certain types of real estate, such as condominium sales, or sales in certain geographic regions. There may be a variety of factors to be considered in order to efficiently and practically route the lead to the responder who is most likely to develop the lead. Such factors may include the source of the lead, the price involved, the type of inquiry (for example, the purchase of a home versus the sale of a home), the city or region, the consumer making the request, or the specific sales representative requested in the lead itself, to name a few. There may be a need to modify the lead routing rules or add new rules as the market or business environment changes, and the need to modify the lead routing rules may be felt at different levels of the organization. For example, the manager of a real estate brokerage may need to structure the routing of leads to certain sales groups in the brokerage based on the source of the lead and the region involved. However, the team leader of each sales group may require that additional criteria be examined to route the lead to the appropriate agent within the group, such as the price range involved or the type of purchase or sale considered (e.g., historic building, commercial real estate, or new construction). Different team leaders may have different needs and different criteria to facilitate the development of the leads.

Efficient routing to the responder who is best equipped to develop the lead is essential for providing the business with the best chance to satisfy the customer's needs. And, routing a lead to an inappropriate or ill-equipped responder may be costly in terms of lost revenues and low customer satisfaction. For example, the routing of a lead to a sales representative who does not deal with the product requested on a regular basis may mean that the representative is unable to answer all of the consumer's questions in an appropriate amount of time, or may give the consumer the impression that the business organization as a whole lacks knowledge on the product. Similarly, the routing of a lead to a sales representative who has not dealt with that particular consumer before may disadvantage the transaction if there is a sales representative within the organization with whom the consumer has conducted transactions and who the consumer trusts.

In addition to efficient routing to the appropriate responder, leads must be acted upon and developed within an acceptable time frame to provide any possibility that the lead will result in a sale. A lead that is routed to the correct responder may sit idle in that responder's lead queue, and the opportunity to provide a product or service based on that lead may be wasted because no other responder may be able to access that lead. Leads may be ignored or forgotten for a number of reasons. For example, a responder may have a backlog of leads and may simply not have the chance to develop a lead at the end of the queue until a later time, when the consumer's needs may have been otherwise satisfied by a competitor or become moot. Likewise, a responder may be on vacation or have an odd schedule such that leads received on a certain day may not be accessible until several days later. While the lead becomes cold in one responder's queue, another responder may have the time, the ability, and the inclination to develop that lead. However, with no way to access the lead from another responder's queue or have the lead forwarded to the free responder, the free responder cannot act to develop what may have been a valid and fruitful lead. Valid, undeveloped leads may cost businesses an enormous amount of money, both directly and indirectly. An undeveloped lead may result in a direct loss of revenues associated with that particular lead, and it may also result in an indirect loss of future revenues as a result of ignored and unsatisfied customers who decide to take their business elsewhere.

Thus there exists a need for a system and method of delivering leads to a responder in way that allows multiple levels of criteria to govern the delivery, provides different members of the organization with different levels of access to modify the delivery rules, and provides a mechanism for automatically escalating an undeveloped lead to another responder.

BRIEF SUMMARY OF THE INVENTION

The present invention provides systems and methods for the routing of leads to appropriate responders. Specifically, in one embodiment, the present invention provides a system that uses a delivery rules engine configured to apply two or more delivery rules to a lead. The delivery rules are prioritized, such that the delivery rules engine applies the delivery rules to the lead according to the priority associated with each delivery rule. Based on a comparison of the lead to the delivery rules, the delivery rules engine determines which delivery rule is satisfied by the lead. The system then delivers the lead to a first responder according to a delivery instruction specified in the delivery rule that is satisfied by the lead.

In some embodiments, each delivery rule comprises a plurality of criteria. Some of these criteria may relate to a source of the lead, such as the provider of the offering or the system that generated the lead. Further, some of the criteria may relate particular information about the offering. For example, in the instance where the offering is real estate, the criteria may relate to the location, size, number of rooms, price, etc. associated with the property. In this embodiment, the delivery rules engine of the present invention applies each of the criteria to the lead and determines which delivery rule that is satisfied by the lead. The system then routes the lead to the first responder indicated in the delivery rule.

In some embodiments, the systems and methods of the present invention may further include devices and methods for escalating delivery of a lead to another responder if the first responder either rejects the lead or fails to accept the lead within a given time frame. For example, in at least one of these embodiments, the system of the present invention may further include an escalation rules engine configured to apply at least one escalation rule and to route the lead to a second responder. For example, in one embodiment, the escalation rule comprises a lead expiration criteria defining an expiry period of time that the lead is to be provided to the first responder. If the first responder does not accept the lead prior to the end of the period of time, the escalation rules engine removes the lead from the purview of the first responder and delivers the lead to the second responder.

In some embodiments, if the first responder either rejects or fails to accept a lead within a given time frame, the system reapplies the lead to the lead delivery rules and determines a next responder to deliver the lead to.

In addition to providing systems and methods for the routing of leads to appropriate responders, the systems and methods of the present invention may also provide devices and methods that a responder may use to manage and edit the various delivery rules. For example, the system of the present invention may in some embodiments provide an interface to a user, such as a broker. The user interface allows the user to define the various delivery rules used by the delivery engine. The user may select various criteria associated with each rule. The user can also select routing information to be associated with each rule and used by the system to route the lead if it meets the criteria associated with the delivery rule. In some embodiments, the user interface allows the user to prioritize the delivery rules to indicate the order in which the delivery rules are to be applied to the leads. The user interface may be similarly used to configure the escalation rules.

The user interface also provides various other functions for the managing of leads. Specifically, the system may allow a responder to accept or reject leads routed to him or her. The user can enter and store information associated with the leads and archive the leads. The user interface may provide various other user-related functions, such as storage of user contacts, notes, etc.

In general, as described further below, the present invention provides various systems and methods that allow for efficient routing of leads to appropriate responders. The systems and methods allow for customization of the various delivery rules used to route the leads. They systems and methods provide mechanisms for the re-routing or escalation of leads if the first responder does not accept the lead. The systems and methods also provide a convenient user interface that allows a user to manage his/her leads, as well as store contacts and other information.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION OF THE INVENTION

The present invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

As an initial point, the systems and methods of the present invention are described below in real estate environment where leads are collected and routed to real estate brokers and agents. It is understood that the systems and methods of the present invention can be employed in any system where customer leads are used to sell offerings, such as products or services.

The systems and methods of the present invention provide a technical effect for systems that gather information regarding a consumer in the form of leads and distribute the leads to responders. Specifically, the systems and methods provide for efficient routing of leads to the appropriate responders, as well as automatic and efficient re-routing of a lead to a new responder if the lead is not acted upon by the original responder. Prior art systems use rudimentary means for routing of leads that may require added processing of leads and added human intervention to route leads. Further, these prior art systems may not include mechanisms to re-route leads, allowing the leads to become stale in some cases.

Figure 1:
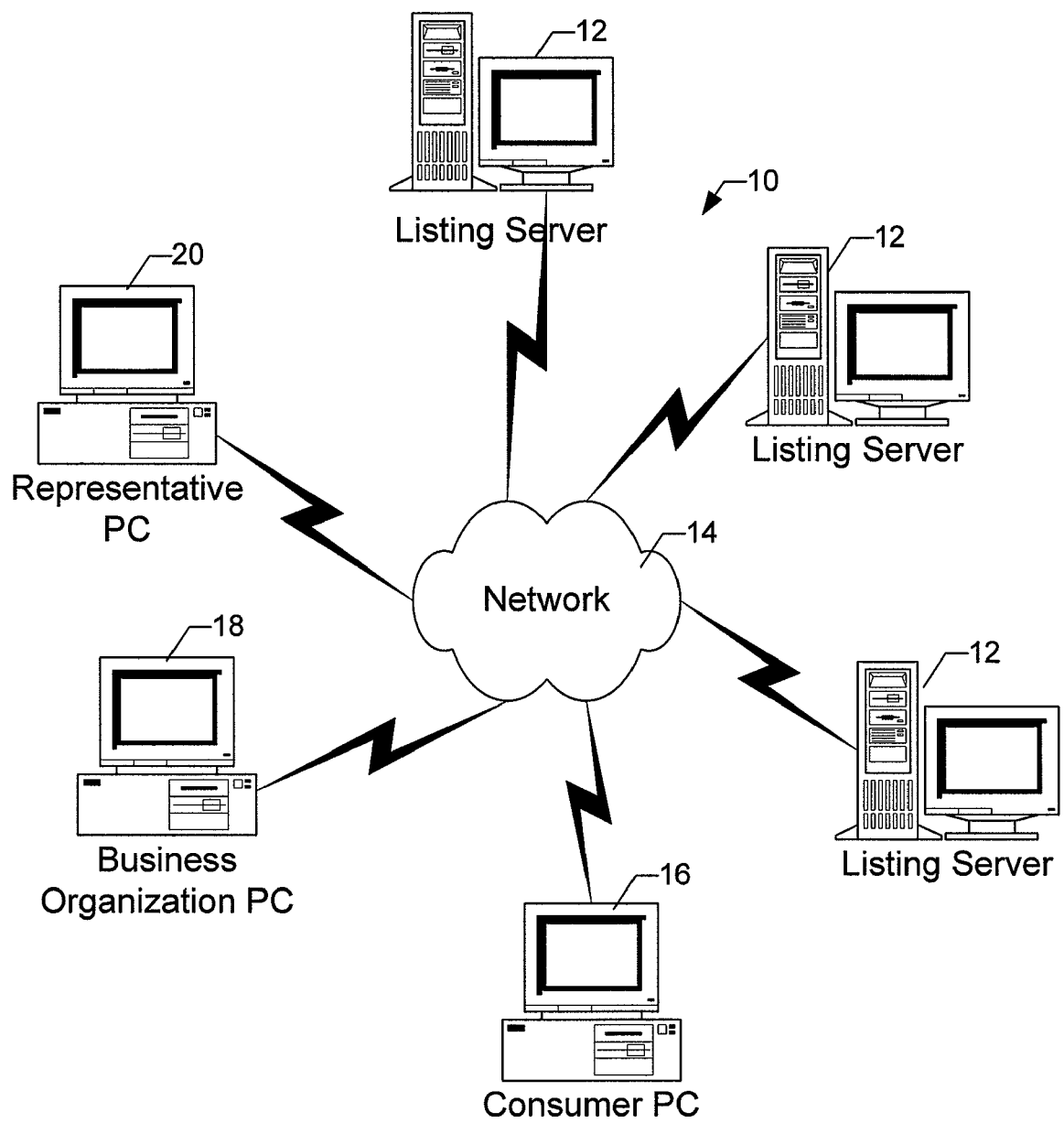
FIG. 1 illustrates a typical conventional network environment in accordance with one exemplary embodiment of the present invention.

FIG. 1 illustrates an example of a typical network environment 10 in which the systems and methods of the present invention may operate. The system typically includes one or more offering listing servers 12 comprising information related to a particular business. For example, the listing servers 12 may be property listing servers comprising real estate information related to real estate properties for construction, sale or lease. These various servers may be, for example, multiple listing services (MLS) that gather and store data for various properties. The servers could be various real estate brokers or individual agents that collect and store real estate information on properties currently being listed by the broker or agent. The servers could store various web pages from private owners constructing, selling, or leasing real estate. The data on these various servers are typically made available to the public via a network such as a LAN, a WAN, or the Internet. Specifically, potential consumers may access and perform searches on one or more of the various property listing servers using a consumer computer 14, such as a PC, connected to the network. It is understood that a consumer may be a business, an organization, a person, a group of people, or anyone else for whom a lead may be generated.

Many of the offering listing servers collect information on consumers as the consumer performs various queries. The servers may include mechanisms for capturing information about the consumer that, among other things, may include specific interests the consumer may have. For example, either through filling in and submitting a form or merely passively evaluating the consumer's interaction with the server, the system may determine that the consumer is interested in a specific type of real estate in a particular geographic area. This detected interest by the consumer generates a "lead" that should be pursued by a real estate agent.

With regard to FIG. 1, various business organizations 16 and/or representatives 18 of the organizations may also be connected to the network so as to be in communication with the offering listing servers 12. In accordance with the systems and methods of the present invention, leads generated by consumer interaction with the listing servers 12 are transmitted to the appropriate organizations and/or representatives for follow up. In particular, the organizations and/or representatives contract with the various listing servers to receive leads from interested consumers. For example, in the real estate industry the routing of leads to particular brokers or agents is typically based on the contracts established between the property servers and the brokers or agents, as well as the location of the generated lead relative to the geographic area of the broker or agent.

Figure 2:
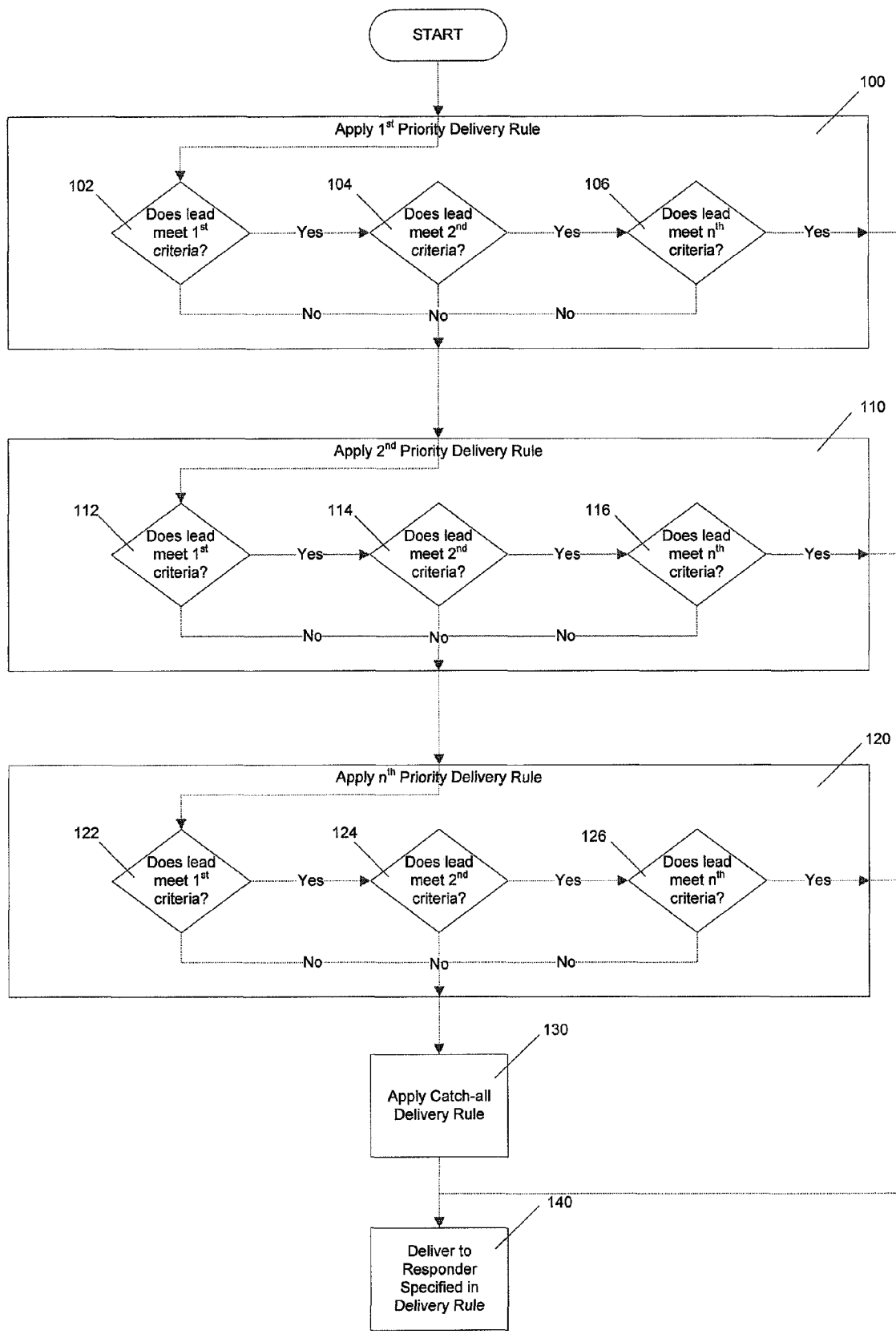
FIG. 2 is a flow chart illustrating the method of delivering leads in accordance with one embodiment of the present invention.
Figure 3:
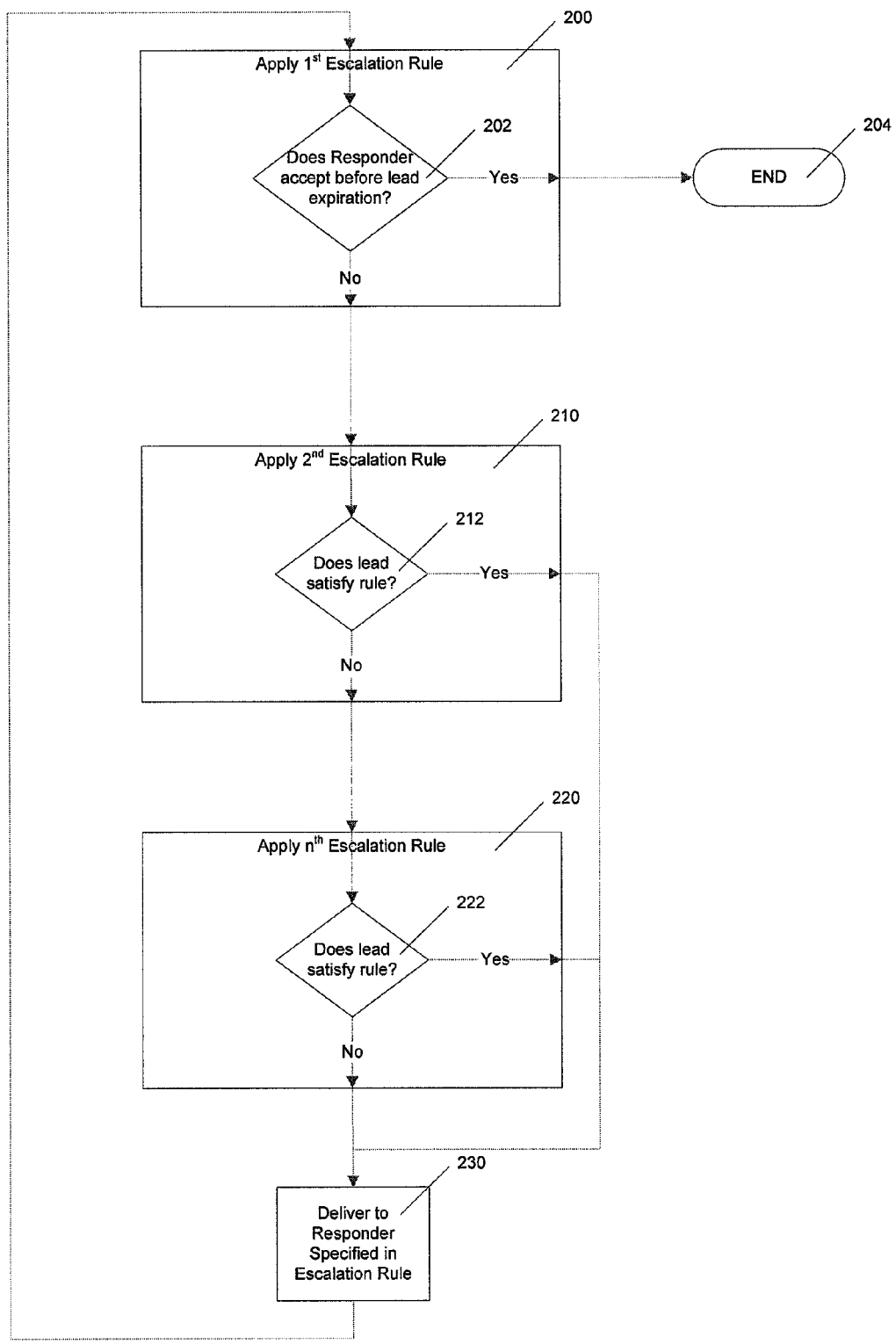
FIG. 3 is a flow chart illustrating the method of escalating leads in accordance with one exemplary embodiment of the present invention.

As a general matter, a lead has a short shelf life. It is important to route the lead quickly to an appropriate responder. The present invention provides systems and methods for facilitating the routing of leads using a customizable lead delivery rules engine and a customizable escalation rules engine. More specifically, the present invention provides a computer program configured to facilitate routing or delivery of leads by applying one or more rules to the lead. If a lead is not acted upon by the responder designated in the delivery rules within a time frame defined in the escalation rules, the program is configured to re-route the lead to a different responder. Possible paths of a lead through the delivery rules engine and the escalation rules engine are illustrated in FIGS. 2 and 3 and are described below. A user interface for allowing a user to customize and manipulate the delivery rules, the escalation rules, and other aspects of the system is also provided and is described below.

The Delivery Rules Engine

Referring to FIG. 2, a lead that has been generated and transferred to a user's server, such as a broker's server, is delivered to an appropriate responder according to a set of delivery rules that are customizable by the user. Each delivery rule is assigned a priority reflecting the order in which the rule is to be applied to the lead. The rule is also given a name or title by which a user may identify the rule.

Each rule includes two or more criteria which must be satisfied in order for the lead to be delivered to the responder specified in that particular rule. See FIG. 2, blocks 100-126. The rule may be configured such that all of the criteria must be met for the rule to be satisfied and the lead to be routed according to the rule, or the rule may be configured such that any one or a combination of the criteria must be met for the rule to be satisfied. FIG. 2 illustrates a scenario in which a rule is met only if all of the criteria are met. If the lead does not satisfy the first rule 100 applied, then the next rule 110 in the chain of rules (e.g., the rule with the next highest priority) is applied to the lead, and so on. A lead satisfying a particular rule is then delivered to the responder specified in that rule. See block 140.

Figure 4:
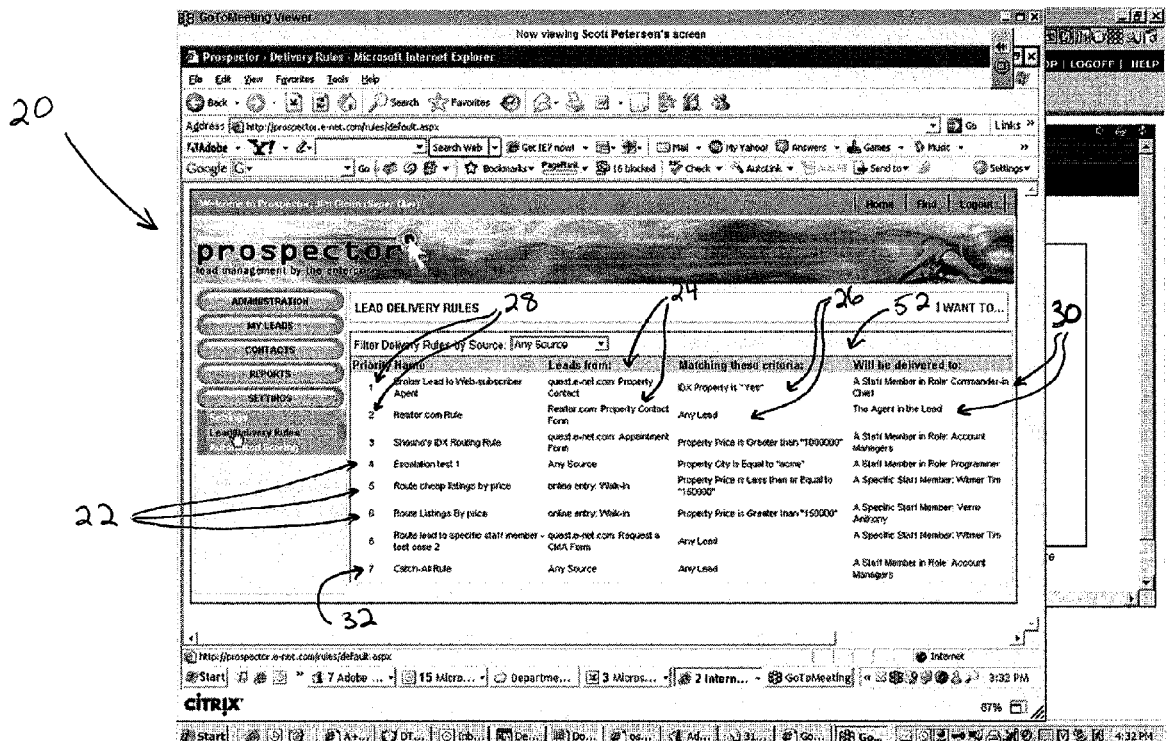
FIG. 4 shows an example of a Lead Delivery Rules page showing Lead Delivery Rules generated by a computer program in accordance with one embodiment of the present invention.

FIG. 4 illustrates a user interface 20 provided by one embodiment of the systems and methods of the present invention. The user interface 20 allows a user to create a set of customized rules 22 to be applied to each lead. In one embodiment, each rule is comprised of at least two criteria 24, 26. The first criteria 24 may pertain to the source of the lead, i.e., which or what type of listing generated the lead. The second criteria 26 may be any number of criteria related to the offering. For example, where the systems and methods of the present invention are used for real estate, the second criteria 26 could be anything relating to the property, including criteria such as those provided in the following list:

i. Agent Code
   ii. MLS Name
   iii. Preferred Agent Code
   iv. Office Code
   v. MLS Number
   vi. IDX Property
   vii. Property Type
   viii. Property City
   ix. Property State
   x. Property Postal Code
   xi. Property Area
   xii. Property Price
   xiii. Minimum Consumer Price Range
   xiv. Maximum Consumer Price Range
   xv. E-Mail Sent To
   xvi. Consumer Role (Buyer/Seller)
   xvii. Consumer Market Area
   xviii. Consumer Time Frame (buying/selling)
   xix. Consumer E-Mail xx. Consumer Phone Number xxi. Consumer City With regard to FIG. 4, a user of the system, such as a broker, can quickly configure various rules 22 for delivering leads to the proper agent or groups of agents for follow-up. Specifically, the user need merely create a rule 22 using the user interface 20 to select criteria 24, 26 to be used for the rule and then save the rule 22 for use by the system in routing leads received from the various listings.

In addition to creating various rules 22 to apply to the received leads, the systems and methods of at least one embodiment of the present invention also allow the user to prioritize the rules 22 in terms of which rules are to be applied first. The priority of a given rule may be indicated, for example, by a priority number 28 preceding the rule 22, as shown in FIG. 4. In this manner, the user can create a series of rules 22 that are applied in a selected order to the received leads. A lead satisfying a particular rule 22 is then delivered to the responder specified in the delivery instructions 30 specified in the satisfied rule.

For example, the first rule 22 to be applied to a lead may be the rule with an assigned priority of 1. In a system configured for a real estate broker, the rule corresponding to Priority 1 may be titled "Property Region Rule." The first criteria 24 to be applied under this rule 22 may be a criteria concerning the source of the lead, such as "On-line entry—Website." The second criteria 26 to be applied may be a region criteria, such as "Area 5," with the rule 22 configured such that both criteria 24, 26 must be met for the rule to be satisfied. An inquiry submitted by a potential purchaser on-line via a web-based form on the broker's website and seeking information on properties in Area 5 would satisfy both of these criteria 24, 26 and would be delivered to the responder specified in the delivery instructions 30 of this rule 22. Additional criteria, such as the price range of the potential purchaser or the type of property desired, may also be associated with the rule, providing further refinement of the routing. If the inquiry submitted by the potential purchaser through the same web-based form instead specified properties in Area 4, one of the criteria associated with the Priority 1 rule would not be met. Because under this rule all criteria must be met, the rule would not be satisfied in this case, and the lead would not be delivered to the responder specified by the first priority rule. The rule assigned Priority 2 would in turn be applied.

Referring again to FIG. 2, the system may be configured to apply several rules to a lead, should the lead not satisfy any of the previously applied rules. See blocks 100, 110, 120. However, no lead should be left undelivered after application of the rules. Thus, the one of the rules may be configured as a "catch-all" rule, such that any lead to which the catch-all rule is applied is delivered according to the responder specified by that rule. See blocks 130, 140. For example, the system may be configured with seven rules 22, prioritized from 1 to 7, as illustrated in the user interface 20 of FIG. 4. The rule with the lowest priority, rule 7, may be configured with all-inclusive criteria, such as "Any Source" or "Any Lead," making it a catch-all rule 32. Thus, a lead not meeting the criteria specified in rules 1 through 6 would be routed according to the responder specified in rule 7. However, the catch-all rule need not be the rule associated with the lowest priority and may be any one of the rules. Similarly, a system may be configured to apply up to 15, or 32, or any number of rules, depending on the needs of the business and the level of refinement desired for routing leads. In any case, application of the delivery rules to a lead, as shown in FIG. 2, serves to route the lead to the appropriate responder so that the responder may develop the lead.

Delivery of the Lead

The rules applied by the delivery rules engine serve to route leads received, for example by a broker, to responders, such as agents, who should develop the leads in a timely fashion. As a preliminary matter, the responder specified by a delivery rule may include individual representatives of the business organization, such as real estate agents working for a broker or sales representatives working for a product supplier. The delivery rule may also specify more than one responder, such as a group of representatives. For example, a lead generated for an auto parts business may be delivered, according to a satisfied rule, to a Mechanical Sales Group. The group may consist of one or more individuals, and an individual may be a member of multiple groups or may be limited to membership in one group only. The system may be configured such that the lead routed to a group is delivered to all representatives in that group. The first representative to accept the lead may be recognized as the accepting responder, and the lead may then be inaccessible to the other representatives in the group. Alternatively, the lead delivered to a group may be delegated by a group leader to a specific representative in the group, based on workflow or other business considerations. The group leader may also have the ability to further apply routing rules to the lead such that the lead is routed to a certain representative in the group or delivered to a different group for routing.

A lead may be delivered to a responder in a number of ways, depending on the technology implemented by the business. For example, the lead may be delivered by automatic e-mail notification or other computer network-delivered notification. Alternatively or in addition to computer notification, the lead may be delivered to an individual via text message on a cellular telephone. The lead may also be delivered through an automated voice message notifying the responder of the existence of the lead and the location on the system where the details may be viewed.

Figure 5:
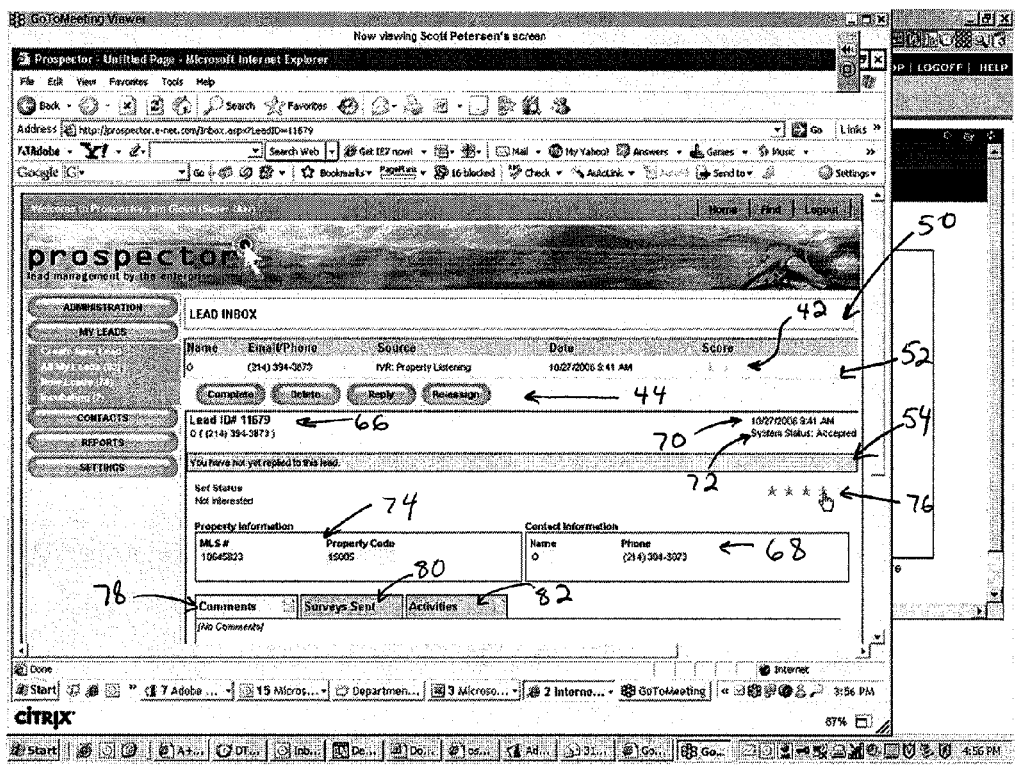
FIG. 5 shows an example of a Lead Inbox page generated by a computer program product in accordance with one embodiment of the present invention.

FIG. 5 illustrates a user interface 20 according to one embodiment of the present invention that would be provided for a representative, such as an agent, to review leads routed to his or her attention. As illustrated, the user interface 20 provides a listing 42 of the leads that have been routed to the user. The user interface allows the agent to either accept, reject, or reassign a lead using operational buttons 44. If the user accepts the lead, the lead is added to the list of leads that the user is currently managing, shown in FIG. 6. The user can also edit the leads and manipulate the leads in various ways, as is described in greater detail below.

The Escalation Rules Engine

Delivery of a lead to a responder triggers the application of escalation rules, which monitor the lead to ensure that a responder has accepted the lead and is acting to develop the lead. As previously discussed, when a lead is routed to the agent by the system, the agent can typically decide whether or not to accept the lead. Specifically, when the lead is delivered to a responder, the individual or group to which it was routed has a predetermined amount of time to accept the lead according to a set of escalation rules in an escalation rules engine. FIG. 3 illustrates one possible configuration of the escalation rules as applied to a lead that has been delivered to a responder.

The escalation rules are configured to escalate the lead, or in other words re-route the lead to a different responder for acceptance. In this way, a lead that is ignored or not accepted within an appropriate time frame may be delivered to a different responder for development, rather than remain idle waiting for the initial responder to act. The escalation rules include one or more criteria governing the re-routing of leads, in addition to a time criteria specifying the amount of time allotted for the responder to accept the lead, after which the lead is considered to be expired. See FIG. 3, blocks 200-230. For example, under the escalation rules the responder may be allowed 24 hours to view and accept the lead from the time it was delivered to the responder. If the responder accepts the lead within 24 hours, then the lead exits the escalation rules engine, having satisfied the first escalation rule. See blocks 200-204. If, however, the responder fails to accept the lead within the allotted 24 hours (thus failing the first criteria of the escalation rules), the lead is re-routed according to additional criteria, represented in blocks 210-222.

The response time for acceptance of the lead is configurable. An acceptable response time is typically based on the shelf life of the offering. For example, 24 hours may be appropriate for accepting a lead regarding purchase of real estate, where the user is expected to take a longer time in deciding to purchase. However, shorter response times may be needed for offerings where the user is likely to make a purchase decision in a shorter time frame.

Re-routing of a lead under the escalation rules typically occurs in one of two ways. The lead may be delivered according to the escalation rules, or the lead may be routed to the delivery rules engine for delivery according to the delivery rules. If the escalation rules are applied to the expired lead for direct re-routing, the escalation rules will specify the new responder or responders to whom the lead satisfying the particular escalation rule will be delivered. This is illustrated in FIG. 3, blocks 200-230. The new responder will also have a certain amount of time in which to act upon the received lead, as shown in blocks 200-204. Failure of the new responder to accept the lead will trigger the re-routing criteria of the escalation rules, blocks 210-230, to deliver the lead to yet another responder.

Alternatively, the escalation rules may deliver the lead to the delivery rules engine for re-routing according to the delivery rules. See FIG. 2. In other words, a lead delivered to the delivery rules engine may be routed to a subsequent responder according to the prioritized delivery rules originally applied, as described above. For example, an expired lead, as defined by the escalation rules, may be delivered to the delivery rules engine for further routing. The rules in the delivery rules engine would thus be applied to the lead according to the rule priority, as previously described, until a rule is satisfied. The lead would then be delivered to the responder specified in the satisfied rule. The delivery rules engine is configured, however, such that the lead will not be re-routed to the original responder who previously failed to accept the lead. Thus, for example, any rule in the delivery rules engine that specifies delivery to a previous responder (who caused the lead to expire) would be bypassed or would not be satisfied when that rule is being re-applied to the same lead. As a result, the delivery rule having the next highest priority would be applied to the lead, and so on, until the lead is successfully re-delivered.

The escalation rules may be customized in a number of ways to ensure appropriate development of the leads received considering the needs of the particular business. The escalation rules engine may be configured such that the escalation rules are associated with and customizable for each responder through the broker interface 20, shown in FIG. 7 and discussed in greater detail below. The escalation rules may consider various responder-specific criteria such as the job function, work schedule or preferences of the responder, as well as lead-specific criteria such as the source of the lead. For example, if the responder is a real estate agent who works only Sunday through Wednesday, the escalation rules may be designed such that the agent has four days to respond to any leads received on Wednesday. Alternatively the escalation rules for that agent may be configured to re-route leads received on Wednesday to other agents working Wednesday through Saturday.

The User Interfaces

Figure 8:
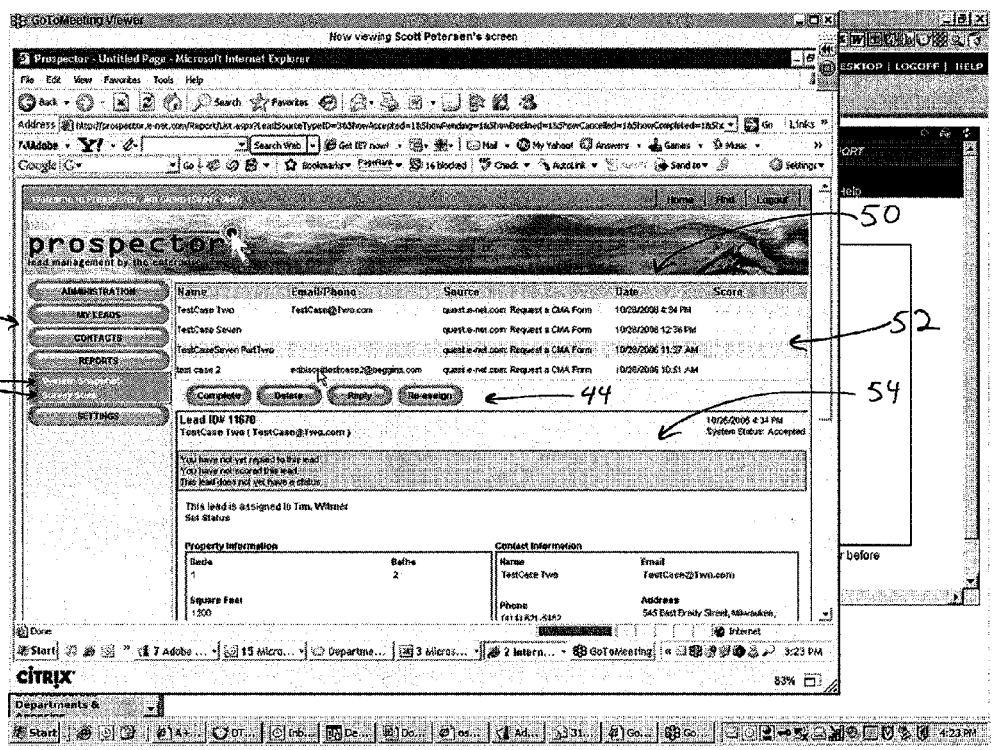
FIG. 8 shows an example of a user interface with navigational buttons and a viewing window generated by a computer program product in accordance with one embodiment of the present invention.

Embodiments of the invention also provide a system 10 for delivering and escalating leads. The system 10 includes a web-based graphical user interface 20 configured to allow a user to customize and create rules in the delivery rules engine and the escalation rules engine, view lead details, and accept leads for development. Referring to FIG. 8, one embodiment of the interface 20 provides a number of navigational buttons 46 on a side panel of the screen for accessing information organized under different tabs of the system 10. The information under each tab is further organized according to various subcategories 48. The button 46 associated with each tab may expand to display various associated subcategories 48. Both the tabs and the subcategories, as well as any further organizational substructures, are customizable according to the business needs of the particular organization. Various formats may be available for editing and entering information, such as drop down boxes, text fields, and check boxes.

The interface 20 also has a viewing window 50 configured to display information according to the various tabs and subcategories accessed. The viewing window 50 may include a summary pane 52 configured to display a list or table of items (e.g., information or options associated with the selected navigational button 46) that may be accessed or viewed, operational buttons 44 configured to allow the user to manipulate the items displayed in the summary pane 52, and/or a reading pane 54 configured to display details for a particular item or items selected from the summary pane 52 and to provide fields for user input and modification. The viewing window 50 may display information in different ways, according to the tab or subcategory of the system accessed and the needs of the particular business.

In one exemplary embodiment, the navigational buttons describe tabs for "Administration," "My Leads," "Contacts," "Reports," and "Settings." Each tab may be customized to include any other category of information that may be useful to the particular business.

The Administration button 46 may expand to display and provide access to various subcategories 48 associated with the tab, such as Offices, Roles, Staff, Surveys, and Lead Statuses. The Offices subcategory may include information regarding the offices within a particular organization. For example, the Offices subcategory may provide information regarding office locations, business specialties, office hours, and other associated contact information for the offices.

Figure 9:
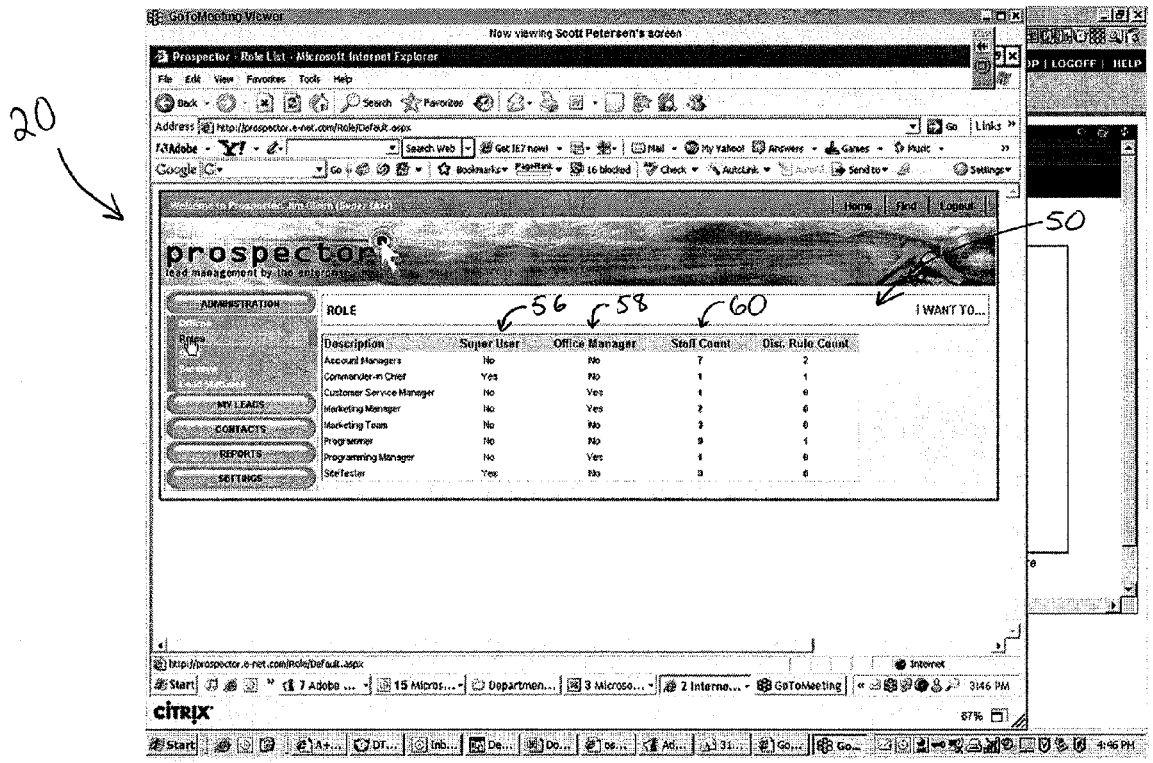
FIG. 9 shows an example of a Role page under an Administration tab generated by a computer program product in accordance with one embodiment of the present invention.

The user interface 20 associated with the Roles subcategory is illustrated in FIG. 9 and may include information pertaining to the various representatives of an organization. Roles may be created to describe the title, position, or qualifications held by one or more representatives in the organization. Other information associated with each role may also be displayed in the viewing window 50, including the level of access and editing power 56 with respect to the delivery rules engine, the escalation rules engine, and other customizable aspects of the system; whether the role carries special privileges or titles 58, such as the title of Office Manager; the number of staff members assigned to each role 60; and other information, depending on the needs of the organization.

Figure 7:
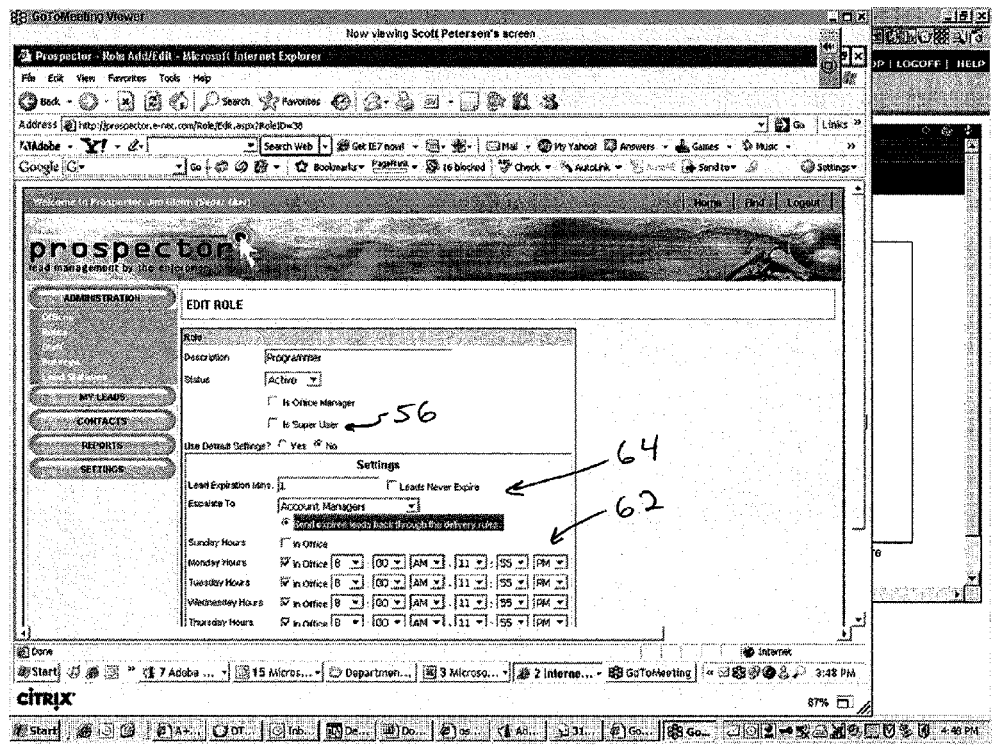
FIG. 7 shows an example of an Edit Role page with Escalation Rules generated by a computer program product in accordance with one embodiment of the present invention.

Selecting a particular role listed in the viewing window 50 may display details on the screen pertaining to that particular role, such as the description of the role, special distinctions, and the status of the role (active or inactive), and allow the user to edit this information. This is illustrated in FIG. 7. Special distinctions may include whether the role members are designated as Super Users 56, which would indicate that the users have the highest level of access editing power. The designation of a role as Super User may be made on this screen by those having the appropriate level of editing power.

The screen represented in FIG. 7 may also display the work schedule 62 and the escalation rules 64 associated with the selected role. For example, the role of Programming Manager may be associated with a Lead Expiration time of 30 minutes, resulting in the re-routing of a lead received by a member of the Programming Manager role after the passage of 30 minutes if the lead is not accepted. Alternatively, the Lead Expiration time may be set such that the lead never expires. The role may provide additional escalation rules 64 such as instructions specifying the responder to which the lead should be re-delivered. As previously discussed, the lead may be delivered to representatives having a particular role within the organization, in which case multiple representatives may receive the lead, or the responder may be a specific representative, such as the manager of the role or work group. The escalation rules 64 may also route expired leads back to the delivery rules of the delivery rules engine, which is described below. Some or all of the options and information described under the Roles subcategory, such as those discussed above, may be editable by designated members of the organization.

The Staff subcategory may list the representatives of the organization, as well as the contact information for each representative. The subcategory may also provide editable access to certain options associated with each representative, such as the preferred notification method for leads routed to the representative (e.g., e-mail, pager, or mobile phone). In addition to association with roles, escalation rules may also be associated with the individual representatives under the Staff subcategory. For example, a representative may have a Lead Expiration time that is different than any of the times associated with the roles to which he belongs. A certain responder may be specified for the re-delivery of expired leads according to individualized and customizable escalation rules associated with the particular representative. The individual may also have working hours that differ from the working hours of other representatives assigned to the same role, which may be displayed and editable on this screen.

The Administration tab of one exemplary embodiment may also include a subcategory for Surveys. This may include editable and customizable web-based survey forms such as forms for eliciting customer feedback and gauging customer satisfaction. Surveys may also include forms for gathering information from representatives assigned to a particular role, individual representatives, or all the representatives of an organization, such as surveys regarding work conditions or dealings with an outside supplier.

The subcategory of Lead Statuses under the Administration tab may provide recipients of a lead or other representatives the ability to apply classifications to a lead. For example, the progress of the development of a lead may be described, such as with terms like "Interested Buyer," "Interested Seller," "In Contract," and "Sold." In this way, the system may be used to generate reports and display information based on the status of a lead, as described in greater detail below.

The Administration tab of one exemplary embodiment may include additional functionality based on the needs of the particular business. For example, in the real estate context, the tab may include an Activity subcategory that allows a responder, such as a real estate agent, who has accepted the lead to schedule various activities associated with the lead, such as a closing on a property purchase.

Figure 6:
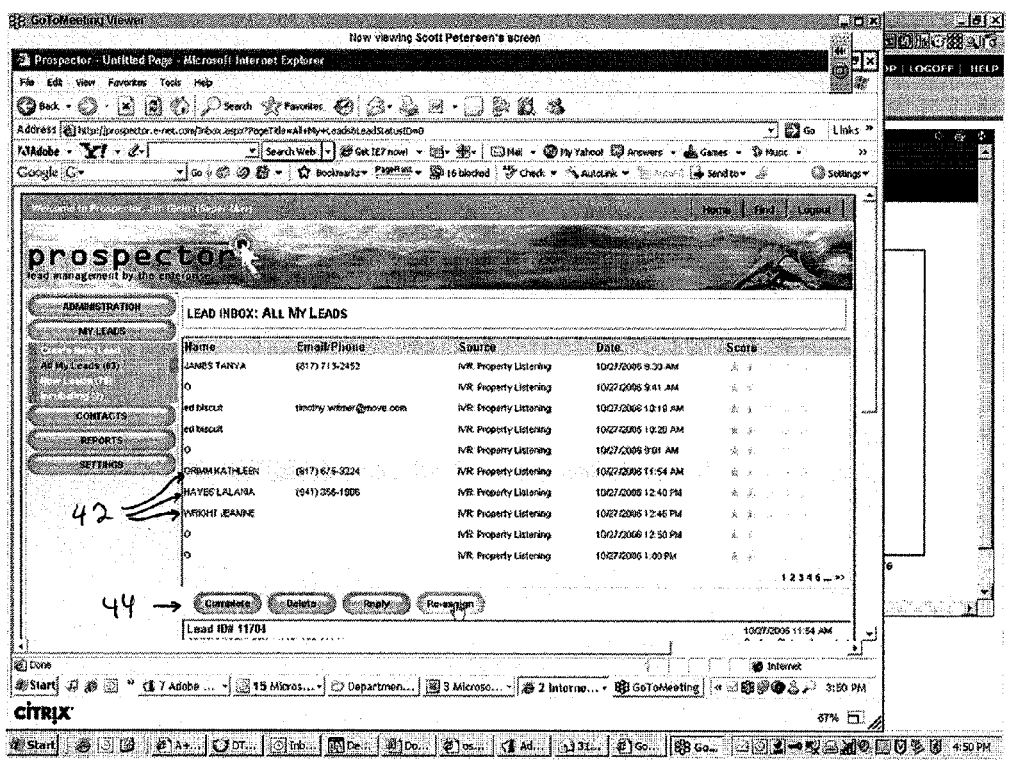
FIG. 6 shows an example of a Lead Inbox page displaying All My Leads generated by a computer program product in accordance with one embodiment of the present invention.
Figure 10:
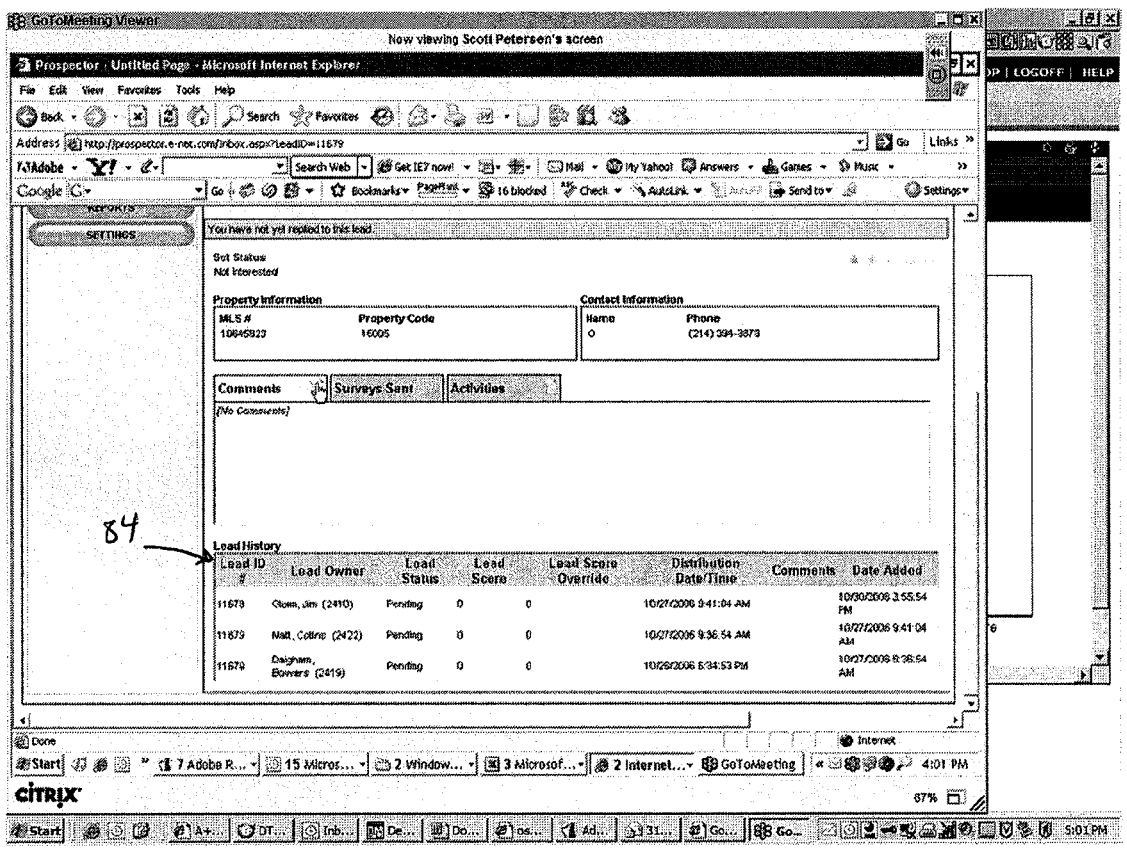
FIG. 10 shows an example of a Lead History pane generated by a computer program product in accordance with one embodiment of the present invention.

Another tab that may be included in one exemplary embodiment of the system is a My Leads tab, illustrated in FIGS. 5, 6, and 10. In general, such a tab may contain information pertaining to the leads received and/or accepted by a particular responder. The initial screen under the My Leads tab, for example, may include a Lead Inbox displaying a list of leads 42 received by a responder in the summary pane 52 of the viewing window 50. The list may present certain descriptive information summarizing each lead, such as the Name of the contact associated with the lead, Email/Phone contact information, the Source of the lead, and the Date the lead was received, among others. Operational buttons 44 may be included to allow the manipulation of leads selected from the summary pane 52. For example, the operational buttons may include buttons for marking a selected lead complete, for deleting a lead, for replying to a lead, and for re-assigning a lead, as well as for any other operation deemed important to the business.

Individual leads selected from the summary pane 52 may be presented in greater detail in the reading pane 54. For example, the lead identification number 66, contact information 68, date and time the lead was received and/or accepted 70, status 72, and/or lead description 74 (such as a description of the property in which a potential buyer has expressed interest) may be represented in the reading pane 54. The reading pane may also include the "score" 76 of a lead, graphically representing information such as the validity of a lead, the expected yield of a developed lead, or the time sensitivity of a lead, among other aspects determined to be important.

The reading pane 54 of the Lead Inbox may additionally include sub tabs for displaying certain information associated with the lead selected in the summary pane. For example, the reading pane 54 may include a sub tab for Comments 78 that allows a user to enter comments on the particular lead in a text field, a Surveys Sent sub tab 80 that keeps track of and/or displays the results of any surveys prepared and sent that are associated with the lead, and an Activities sub tab 82 that allows the user to plan and monitor activities and events associated with the lead. The Activities sub tab 82 may include a calendar interface to facilitate activity and event scheduling, as well as description, status, and note fields to record the type of activity planned for a lead. For example, a client meeting associated with a lead may be scheduled using the Activities sub tab 82.

Leads contained in the Lead Inbox may be further organized into subcategories or folders within the My Leads tab, allowing a responder to view only some of the leads associated with a particular criteria. For example, the My Leads tab may include a subcategory for All My Leads, illustrated in FIG. 6, in which all leads received and/or accepted by the responder are displayed in the summary pane. Other subcategories may display only New Leads, for example only leads received in the past week, and/or leads with a particular status, such as Incubating Leads.

Each Lead Inbox or subcategory of a Lead Inbox may further include a Lead History pane 84, represented in FIG. 10, displaying the history of a selected lead. The history of a lead may include information such as the Lead Owner, the Lead Status, the Lead Score, the Receipt Time of the lead, Comments, as well as other information according to the needs of the business. In this way, a sales representative, for example, may track the progress and development of a lead from the time the lead was generated to the present.

In one exemplary embodiment of the system, new leads may also be generated under the My Leads tab, for example under a Create New Lead subcategory. In this way, a real estate agent, for example, may record information based on a conversation with a potential home buyer who "walks in" to the agent's office and thereby may generate a lead for delivery to an appropriate responder.

According to an exemplary embodiment, the system may include a Contacts tab for recording and maintaining a list of contacts associated with the leads in the system. A contact may be a client or business for which a lead has been generated in the past. For example, a car dealership may have contacts that include individuals, businesses, and agencies that have inquired about purchasing a car, as well as suppliers that may potentially provide goods and services to the dealership to facilitate its business. The contacts may be displayed in various ways, according to the needs of the business. For example, the contacts may be grouped alphabetically, with each contact appearing in individual viewing panes arranged on the screen. Contact information may include the contact name, address, phone number, and e-mail address, as well as the total number of leads and descriptions with which the contact is associated. Each contact may also provide a user with the ability to export the contact information to an e-mail system, such as Microsoft® Outlook, or to access one or more of the leads with which the contact is associated. The Contacts tab may display contacts associated with all leads in the system, or contacts associated with only a portion of the leads in the system, for example only those associated with the leads accepted by the responder. Selecting a contact may open an edit screen in which the user may edit various fields of contact information, according to the editing powers assigned to the particular user.

Figure 11:
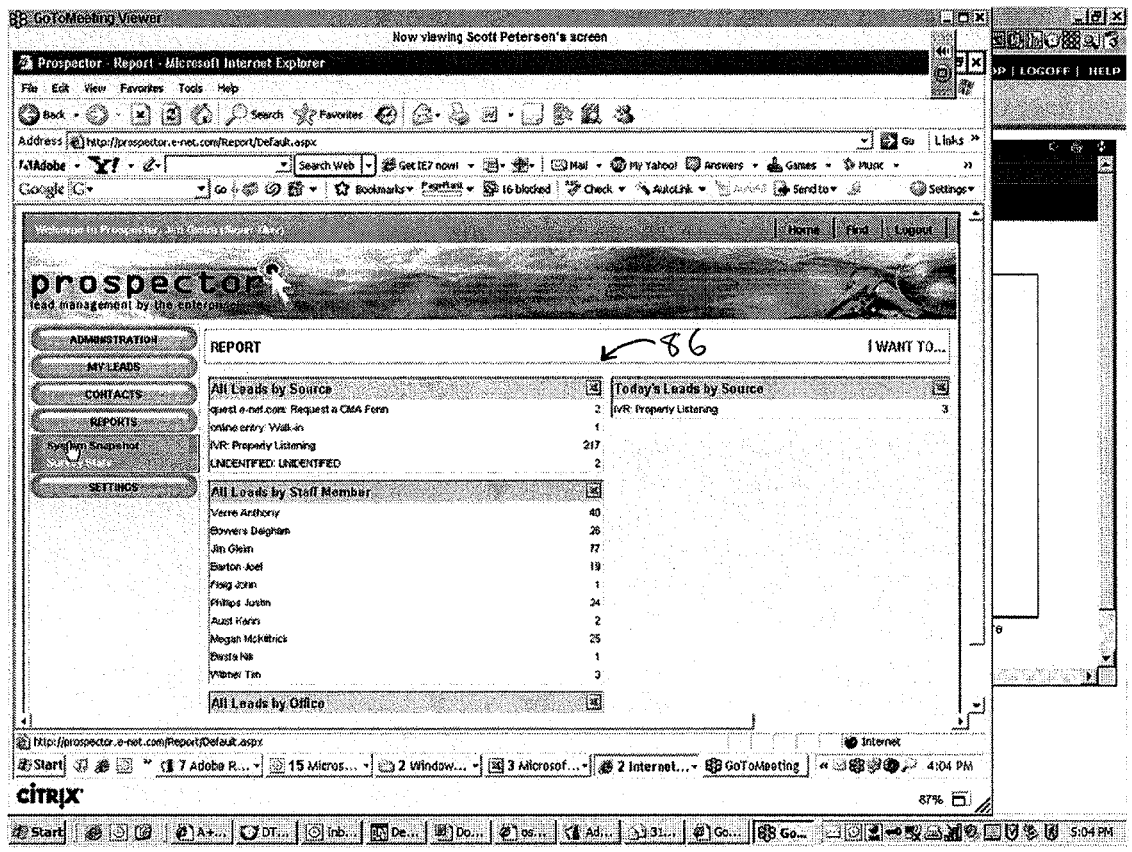
FIG. 11 shows an example of a System Snapshot page under a Reports tab generated by a computer program product in accordance with one embodiment of the present invention.

An exemplary embodiment of the system may also include a Reports tab, illustrated in FIG. 11, that provides a user with the ability to generate various custom reports. One subcategory under the Reports tab may provide a System Snapshot 86 that summarizes the various leads in the system. The System Snapshot 86 may display a count of the leads according to various categories, such as All Leads by Source, All Leads by Staff Member, All Leads by Office, and Today's Leads by Source, among others. Information represented under some such categories may also be accessible from other tabs of the exemplary embodiment. For example, leads described and displayed under the category All Leads by Staff Member may also be accessed through the Administration tab under the subcategory Staff. In each category of the System Snapshot 86, a particular type of report may be selected to generate a detailed report. For example, under All Leads by Source, a particular source of leads, such as Generic Database, may be selected to produce a report listing all the leads generated by Generic Database and including information associated with the lead, such as the name of the lead, contact information, and the dates associated with the lead, among others. Further details regarding a selected lead may be displayed in the reading pane 54. This report may also be exportable to another application, such as a spreadsheet application or graphing application, for further analysis.

Another tab that may be included in an exemplary embodiment of the system is the Settings tab. The Settings tab may contain information relating to system-wide settings, including escalation rules, lead delivery rules, and lead scoring mechanisms. Information displayed under the Settings tab may be editable by users having certain editing rights, as determined by the business needs of the organization.

Figure 12:
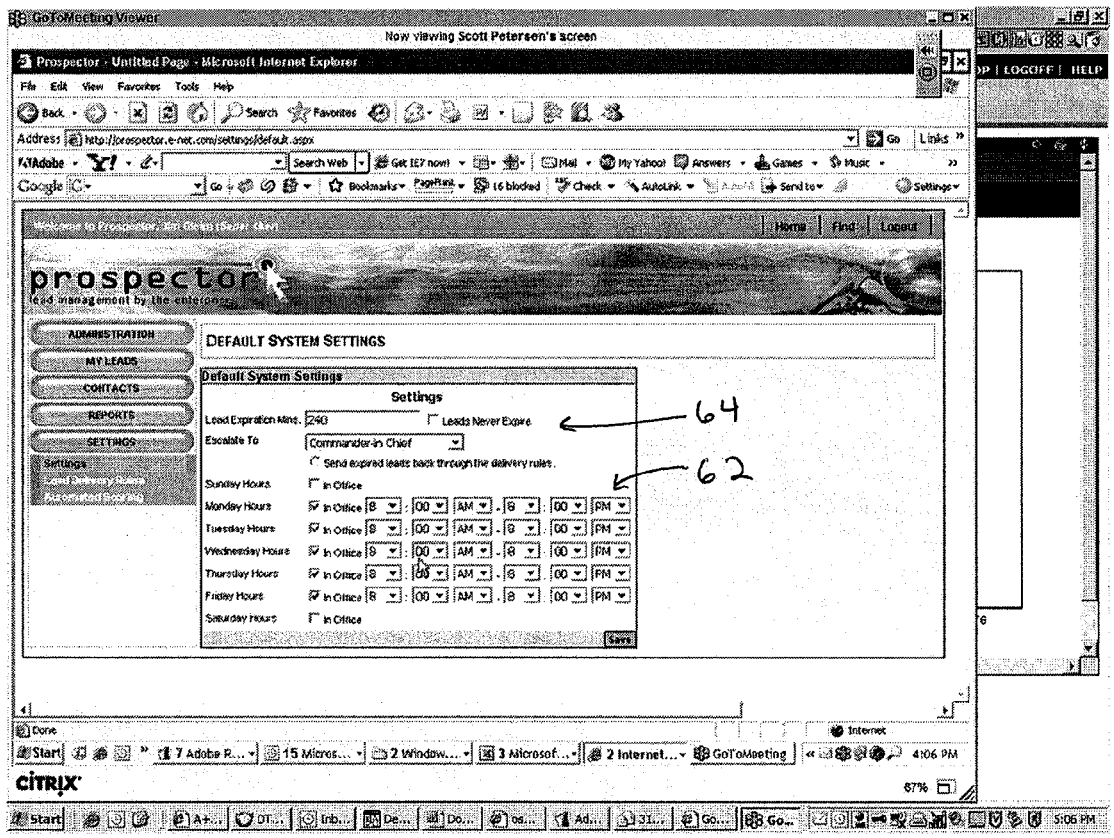
FIG. 12 shows an example of a Settings page under a Settings tab showing Escalation Rules generated by a computer program product in accordance with one embodiment of the present invention.

One subcategory under the Settings tab may be a Settings subcategory, allowing a user with editing rights to configure default escalation rules to be applied to leads. One embodiment of the Settings tab is illustrated in FIG. 12. As previously described, the escalation rules 64 include a Lead Expiration Time, with the option of allowing leads to never expire, as well as rules specifying new responders to which an expired lead will be delivered. Expired leads may optionally be delivered to the delivery rules engine for re-application of the delivery rules to determine a new responder. The default working hours 62 for representatives of the organization may also be set for each day of the week. The default settings may be overridden by the working hours specified in the Administration tab under the Staff subcategory and associated with a particular representative, shown in FIG. 7.

Lead Delivery Rules for the system may also be accessed under the Settings tab in the Lead Delivery Rules subcategory, illustrated in FIG. 4. Lead Delivery Rules 22 essentially govern the delivery of leads in the system to appropriate responders, as previously described. Each rule is assigned a Priority 28, a Name, two or more associated criteria 24, 26, and delivery instructions 30 specifying one or more responders to which the lead is delivered if the rule is satisfied. The Lead Delivery Rules screen may initially display a list of the Lead Delivery Rules in tabular form in the summary pane 52. The list may be filtered to display only certain rules, for example displaying rules containing a certain criteria or generated by a certain source.

Figure 13:
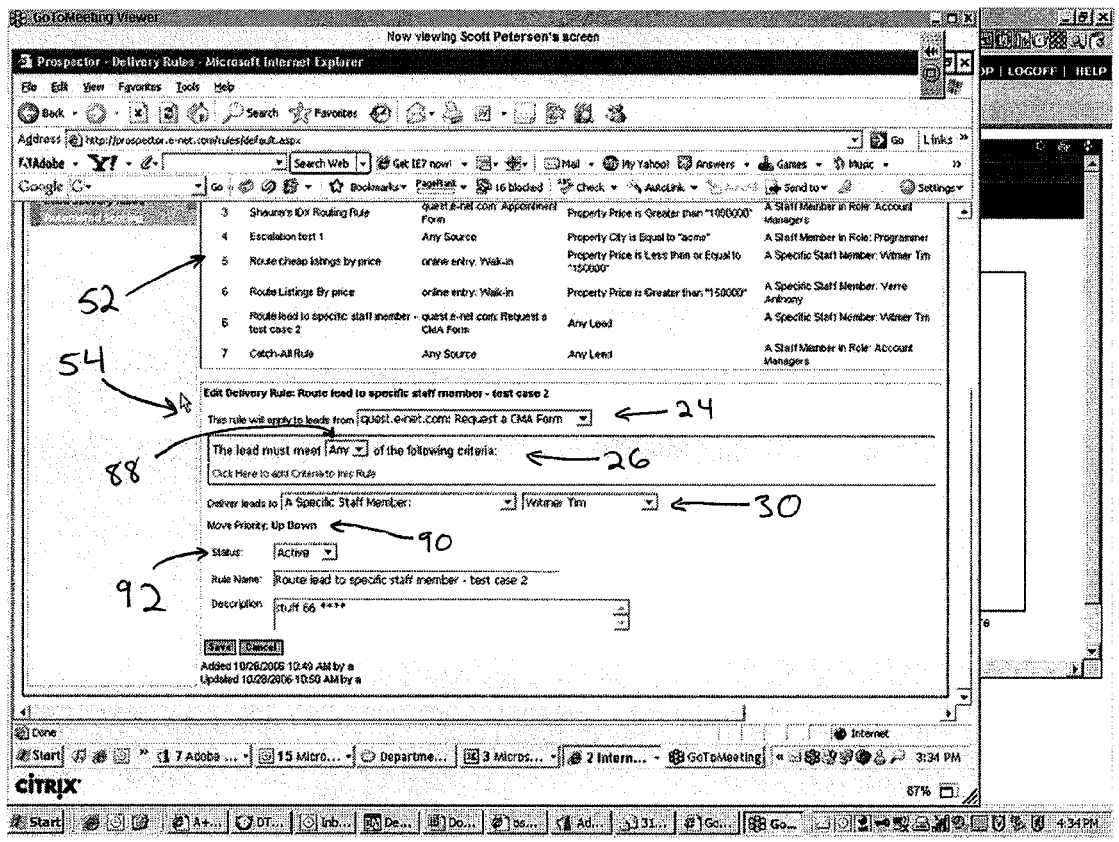
FIG. 13 shows an example of a Lead Delivery Rules page showing delivery rule details generated by a computer program product in accordance with one embodiment of the present invention.

A rule displayed in the summary pane 52 may be selected to display details pertaining to the rule and to allow editing of the rule in the reading pane 54. This is represented in FIG. 13. Details may include a description of the criteria 24, 26 associated with the rule, in addition to the logical relationship 88 between or among the criteria for satisfaction of the rule. For example, a particular rule may include a source criteria ("Lead was generated by Generic Database"), a property value criteria ("Property Value >$1 million"), and a property location criteria ("Property Location=Area 5-7"). The rule may be configured such that the source criteria must be met, but that only one of the two other criteria must be met in order to satisfy the rule. Alternatively, the rule may be configured such that all three criteria must be met to satisfy the rule. Criteria may be modified, added, or deleted, and the relationship between the criteria may also be modified by a user with appropriate editing rights. The criteria defining a rule may be entered or modified using drop down boxes or editable text boxes. For example, two or more criteria may be entered in text boxes using natural language to define the criteria and the logical relationships.

The delivery instructions 30 specifying the responder to which a lead satisfying the rule is delivered may also be edited. The responder may be a group of representatives or a specific representative. For example, the rule may specify delivery to representatives assigned to a particular role, representatives with a certain skill set, representatives at a particular office location, or the rule may specify delivery to a customized list of individual representatives. Alternatively, the rule may specify delivery to a particular individual or may direct the system to deliver the lead to the representative referenced in the lead itself.

Details of a rule accessed through the reading pane 54 may also include the Priority 28 of the rule, which governs the order in which the rule is applied to a lead. For example, a rule with a higher priority (e.g., a priority of 1) would be applied to a lead before a rule with a lower priority (e.g., a priority of 5). The Priority of a selected rule may be changed in the reading pane by moving the priority Up or Down using an up/down button 90 until the desired placement is achieved. Or, the rule may be selected in the summary pane 52 and dragged to the desired spot among the other rules, thereby assigning it a new priority.

In addition, a user may bypass or ignore one or more delivery rules during application of the delivery rules to a lead. The user may accomplish this by changing the status 92 of the lead from Active to Inactive, thereby preventing application of the designated rule to leads. In this way, a rule may be bypassed for a certain amount of time while a record of the rule is maintained in the system, for example in case the rule is to be re-activated and applied to leads in the future. Similarly, specific criteria within each rule may also be assigned a status, such as Inactive. The Rule Name and Description are also editable in the reading pane 54.

The Settings Tab may further include an Automated Scoring subcategory for applying default scores to leads processed by the system. As previously mentioned, scoring may be used by the business organization to evaluate a characteristic of a lead, such as validity or importance, and allow a user to visually compare that characteristic to those of other scored leads. In one case, the system may be configured to apply a default validity score ranging from 0 to 10 based on the source of the lead. For example, leads generated by Generic Database may automatically be assigned a score of 3, whereas leads generated by Personable Sales Representative may be assigned a score of 7. The scores assigned automatically according to the editable parameters found in the Automated Scoring subcategory may be overridden by subsequent scoring applied directly to the lead, such as by a responder that has accepted the lead through the My Leads tab. Scoring may also be assigned according to other criteria based on the particular needs of the business, such as the type of product queried, desired price range, and contact name.

Many modifications and other embodiments of the invention set forth herein will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. An apparatus for delivering a lead to one or more responders, said apparatus comprising:
a processor configured to apply two or more delivery rules to a lead that includes information relating to a consumer interested in an offering, wherein the delivery rules are prioritized, wherein said processor is configured to apply the delivery rules to the lead according to the priority associated with each delivery rule and determine which delivery rule is satisfied by the lead,
wherein said processor is configured to direct delivery of the lead to a first responder according to a delivery instruction,
wherein said processor is further configured to apply at least one escalation rule comprising a lead expiration criteria defining a period of time that the lead is to be provided to the first responder, and wherein being configured to apply at least one escalation rule includes being configured to direct delivery of the lead to a second responder when the first responder does not accept the lead prior to the end of the period of time.

2. The apparatus of claim 1 wherein each delivery rule comprises a plurality of criteria, and said processor is configured to apply each of the criteria to the lead.

3. The apparatus of claim 2 wherein said processor is configured to determine that a delivery rule is satisfied by a lead when all of the criteria associated with the delivery rule are met by the lead.

4. The apparatus of claim 1, wherein said processor is configured to implement an interface, wherein said interface is configured to allow a user to view and/or alter the delivery rules.

5. The apparatus of claim 4, wherein said interface is configured to allow a user to alter the priority associated with at least one delivery rule.

6. The apparatus of claim 4 wherein said interface is configured to allow a user to alter the one or more criteria associated with a delivery rule.

7. The apparatus of claim 2 wherein at least one of the criteria associated with at least one of the delivery rules is based on a source of the lead, wherein said processor is configured to compare each lead to the criteria associated with the delivery rule and determine whether the lead is from the source indicated by the criteria associated with the delivery rule.

8. The apparatus of claim 2 wherein at least one of the leads includes information about the offering associated with the lead, wherein at least one of the criteria associated with at least one of the delivery rules is based on information about the offering associated with the lead, and wherein said processor is configured to compare each lead to the criteria associated with the delivery rule and determine whether the lead includes information corresponding to the criteria associated with the delivery rule.

9. The apparatus of claim 1 wherein the at least one escalation rule includes information indicating the second responder to receive the lead, and wherein said processor being configured to direct delivery of the lead to a second responder includes being configured to remove the lead from the purview of the first responder selected and direct delivery of the lead to the second responder that is specified in the at least one escalation rule.

10. The apparatus of claim 1 wherein said processor being configured to direct delivery of the lead to a second responder includes being configured to apply the two or more delivery rules to the lead to determine the second responder to deliver the lead to.

11. The apparatus of claim 1, wherein at least one of the delivery rules has a first criteria relating to a source of the lead and a second criteria relating to information associated with the offering associated with the lead, and wherein said processor is configured to compare a lead to the first and second criteria of the delivery rule to determine if the lead satisfies the delivery rule.

12. A method for delivering a lead to one or more responders, said method comprising:
applying two or more delivery rules to a lead that includes information relating to a consumer interested in an offering, wherein the delivery rules are prioritized, and wherein said applying step applies the delivery rules to the lead according to the priority associated with each delivery rule;
determining which delivery rule is satisfied by the lead;
directing delivery of the lead to a first responder according to a delivery instruction specified in the delivery rule that is satisfied by the lead; and
applying at least one escalation rule comprising a lead expiration criteria defining a period of time that the lead is to be provided to the first responder, and wherein applying at least one escalation rule includes directing delivery of the lead to a second responder when the first responder does not accept the lead prior to the end of the period of time.

13. The method of claim 12 wherein each delivery rule comprises a plurality of criteria, and said applying step applies each of the criteria to the lead.

14. The method of claim 13 wherein said determining step determines that a delivery rule is satisfied by a lead if all of the criteria associated with the delivery rule is met by the lead.

15. The method of claim 12 further comprising altering the delivery rules.

16. The method of claim 12 further comprising altering the priority associated with at least one delivery rule.

17. The method of claim 13 further comprising altering one or more criteria associated with a delivery rule.

18. The method of claim 13 wherein one of the criteria associated with at least one of the delivery rules is based on a source of the lead, wherein said determining step compares each lead to the criteria associated with the delivery rule and determines whether the lead is from the source indicated by the criteria associated with the delivery rule.

19. The method of claim 13 wherein at least one of the leads includes information about the offering associated with the lead, wherein at least one of the criteria associated with at least one of the delivery rules is based on information about the offering associated with the lead, and wherein said determining step compares each lead to the criteria associated with the delivery rule and determines whether the lead includes information corresponding to the criteria associated with the delivery rule.

20. The method of claim 12 wherein the at least one escalation rule that includes information indicating the second responder to receive the lead, and wherein directing delivery of the lead to a second responder includes directing delivery of the lead to the second responder that is specified in the escalation rule.

21. The method of claim 12 wherein directing delivery of the lead to a second responder includes applying the two or more delivery rules to the lead to determine the second responder to deliver the lead to.

22. The method of claim 12, wherein at least one of the delivery rules has a first criteria relating to a source of the lead and a second criteria relating to information associated with the offering associated with the lead, and wherein said determining step compares a lead to the first and second criteria of the delivery rule to determine if the lead satisfies the delivery rule.

23. An apparatus for delivery of a lead to one or more responders, said apparatus comprising:

a processor configured to apply a set of delivery rules to a lead to determine a first responder to direct delivery of the lead to, the lead including information relating to a consumer interested in an offering, and each delivery rule including a plurality of criteria to be applied to the lead, wherein said processor is configured to apply a set of escalation rules for delivering an expired lead to a second responder, wherein at least one of the escalation rules comprises a lead expiration criteria defining a predetermined time frame, and wherein the expired lead includes a lead that is not accepted by the first responder within the predetermined time frame.

24. An apparatus for delivering a lead to one or more responders, said apparatus comprising:

a processor configured to apply at least one delivery rule to a lead that includes information relating to a consumer interested in an offering, wherein the delivery rule comprises at least two criteria that must be met, wherein the processor is configured to direct delivery of the lead to a first responder according to a delivery instruction, where both criteria in the delivery rule are satisfied by the lead, wherein said processor is further configured to apply at least one escalation rule comprising a lead expiration criteria defining a period of time that the lead is to be provided to the first responder, and wherein being configured to apply at least one escalation rule includes being configured to direct delivery of the lead to a second responder when the first responder does not accept the lead prior to the end of the period of time.

25. The apparatus of claim 24 wherein one of the criteria associated with the delivery rules is based on a source of the lead, wherein said processor is configured to compare each lead to the criteria associated with the delivery rule and determine whether the lead is from the source indicated by the criteria associated with the delivery rule.

26. The apparatus of claim 24 wherein the lead includes information about the offering associated with the lead, wherein at least one of the criteria associated with the delivery rules is based on information about the offering associated with the lead, and wherein said processor is configured to compare each lead received to the criteria associated with the delivery rule and determine whether the lead includes information corresponding to the criteria associated with the delivery rule.

* * * * *